United States Patent [19]
Nunes et al.

[11] Patent Number: 5,964,124
[45] Date of Patent: Oct. 12, 1999

[54] OVERLOAD PROTECTOR FOR ROBOTIC TOOLING

[76] Inventors: Fernando Manuel Rodrigues Nunes, 128 Elderwood Place, Brampton, Ontario, Canada, L6V 3N3; Kaz M. Szmyr, 367 Labrador Drive, Oshawa, Ontario, Canada, L1H 7E9

[21] Appl. No.: 08/891,871

[22] Filed: Jul. 9, 1997

[51] Int. Cl.$^6$ .............................. B25J 19/06; B25J 19/02; F16D 43/28
[52] U.S. Cl. ..................... 74/490.01; 192/56.32; 403/15; 403/DIG. 3; 901/49
[58] Field of Search .............................. 74/490.01, 490.06; 192/56.31, 56.32, 56.33; 403/15, 31, DIG. 3; 901/49, 29; 464/30, 37, 38

[56] References Cited

U.S. PATENT DOCUMENTS 4,848,546  7/1989  McCormick et al. ............... 192/56.32
5,086,901  2/1992  Petronis et al. .................. 192/56.32 X

FOREIGN PATENT DOCUMENTS 3701651  8/1988  Germany ................................. 901/49

*Primary Examiner*—Allan D. Herrman

[57] ABSTRACT

An overload protector is provided which is secured to a robot arm and a tool to protect the tool form being overloaded or forced into an abnormal position. A rocker assembly is located within the cavity in the protector and the cavity is pressurized in order to force a wall of the rocker assembly into a sealing relationship with a wall of the cavity. The rocker assembly has a peripheral wall in which a number of semi-conical detents are formed in the wall of the cavity. The detents are accommodated in the recesses when the rocker assembly is in a sealing relationship with the cavity wall. When the tool is overloaded or forced into an abnormal position the rocker assembly rocks in the cavity with resulting leakage of fluid from the cavity and a drop of pressure. A pressure switch detects that drop and signals the robot to stop.

10 Claims, 6 Drawing Sheets

OVERLOAD PROTECTOR FOR ROBOTIC TOOLING

BACKGROUND OF THE INVENTION

This invention relates to overload protectors and more particularly to an overload protector which protects a tool activated by a programmable robot to prevent the tool from being overloaded or being forced into an abnormal position.

In Canadian patent no. 2,004,661 issued to Kaz M. Szmyr, one of the applicants herein, an overload protector is described in which the tool to be protected is attached to a flange which is located within the cavity of a housing. Fluid under pressure is contained within the cavity and the pressure of that fluid forces the flange into a wall of the cavity. There is an opening in that wall and when the flange is forced against the wall it seals the opening shut.

Movement of the tool caused by overloading or abnormal forces applied to it results in movement of the flange away from the wall. Such movement allows fluid within the cavity to escape through the opening and the pressure within the cavity drops. A pressure switch detects the drop in pressure and signals the robot to stop.

Should the tool be subject to torsion, the flange rotates relative to the wall of the housing. Ball bearings are provided in the inside wall of the flange and in the wall of the cavity that faces it. As the flange rotates, the ball bearings force the flange to move away from the hole and fluid within the cavity escapes.

The location of the ball bearings on the flange governs the amount of torsional force required to cause them to force the flange away from the cavity wall. The further those ball bearings are from the centre of the flange the more torsional force must be applied to the flange before the ball bearings force the flange away from the wall.

It has been found that cones can be substituted for ball bearings with improved results. The cones may be in the form of conical detents which are formed in the cavity wall and which are received in conical recesses at the periphery of the flange. Greater axial, angular and torsional movement or compliance can be achieved by this means than by ball bearings. The reason is that ball bearings will tend to roll out of their recesses should such movement be more than very limited and once out cannot be reset into their recesses without dismantling the protector. Conical detents and recesses, on the other hand, permit significantly more of such movement. Moreover should the detents separate from the recesses, the protector need not be taken apart to reset the detents into the recesses.

Conical detents and recesses have another advantage. Should unlimited rotational movement or torsional compliance be required, the detents can be shortened so that they will ride completely out of their recesses should a tool be subjected to a high speed collision. In such event the protector will have more time to signal the robot to stop and, after it has stopped, the detents can be easily reset into the recesses manually by an operator. Should the intensity of the collision be insufficient to cause the detents to ride out the recesses but sufficient to cause them to ride up in the recesses, a spring within the protector will reset the detents automatically into the proper position after the robot has stopped the tool and no manual resetting is necessary.

It has also been found that the sensitivity of the overload protector to axial forces applied to the tool can be enhanced by attaching to the flange an assembly which is slidable to a limited extent relative to the flange. The assembly is designed to allow fluid within the cavity to escape even though the axial force which overloads the tool is insufficient to overcome the pressure of the fluid on the flange.

According to one embodiment of the improvement, the flange has a circular peripheral wall having a plurality of semi-conical recesses formed therein. The cavity has semi-conical detents formed in its wall. The recesses and detents are arranged such that the detents are accommodated within the recesses when the flange assembly is in a sealing relationship with the wall of the cavity. Alternatively the cavity may have recesses in its wall and those recesses are received in detents in the periphery of the flange.

According to another embodiment of the improvement, a hub assembly is attached to the flange and is designed to slide a limited distance relative to the flange. The tool is operatively connected to the assembly such that when the tool is overloaded in such a way that it causes the assembly to advance toward the flange, fluid leaks from the cavity with resulting drop in the pressure of the fluid within the cavity.

DESCRIPTION OF THE DRAWINGS

The invention is described in detail with reference to the accompanying drawings in which:

In FIG. 4, the tool is subject to torsion or compression; in FIG. 5 the tool is subject to compression and in FIG. 6 the force is offset from the centre line of the tool.

Like reference characters refer to like parts throughout the description of the drawings.

DESCRIPTION OF THE PREFERRED EMBODIMENT

Figure 1:
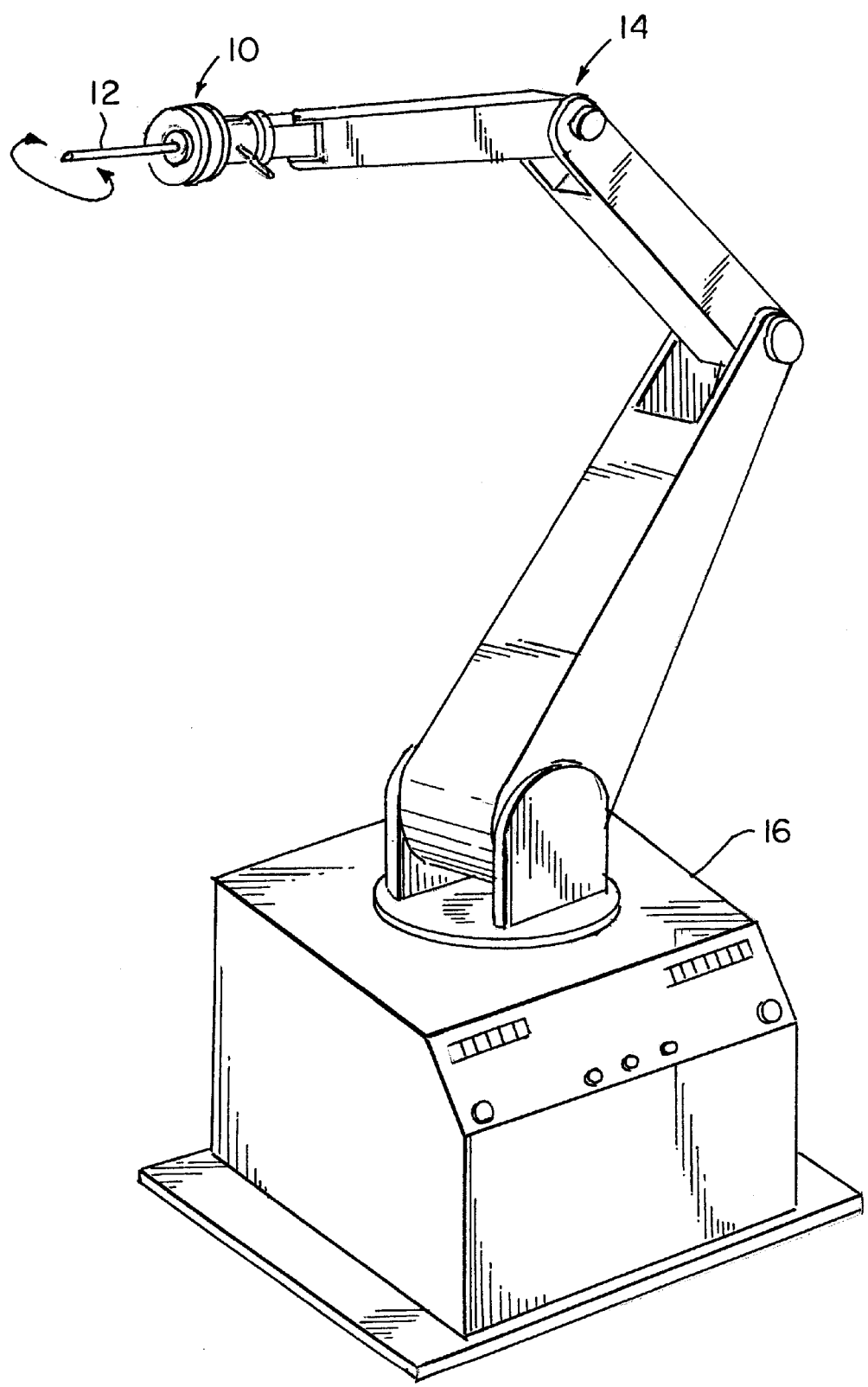
FIG. 1 is a perspective view of the overload protector shown in conjunction with a robot and a tool.

With reference to FIG. 1, the overload protector of the invention is indicated generally by the numeral 10 and is shown connected at one side to a working tool 12 and at the other side to the free end of the arm, generally 14, of a robot. The robot arm is mounted upon a base 16.

Figure 2:
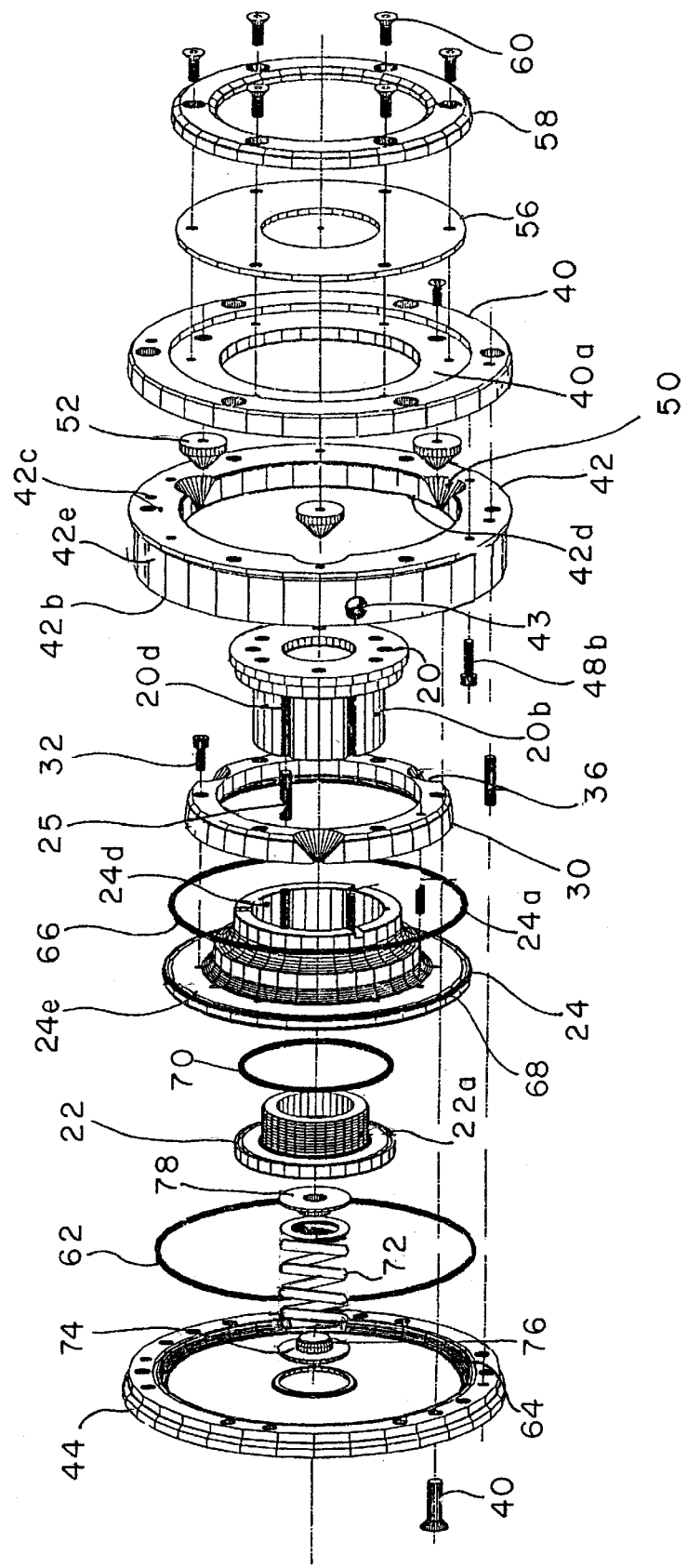
FIG. 2 is an exploded perspective view of the components of the overload protector.
Figure 3:
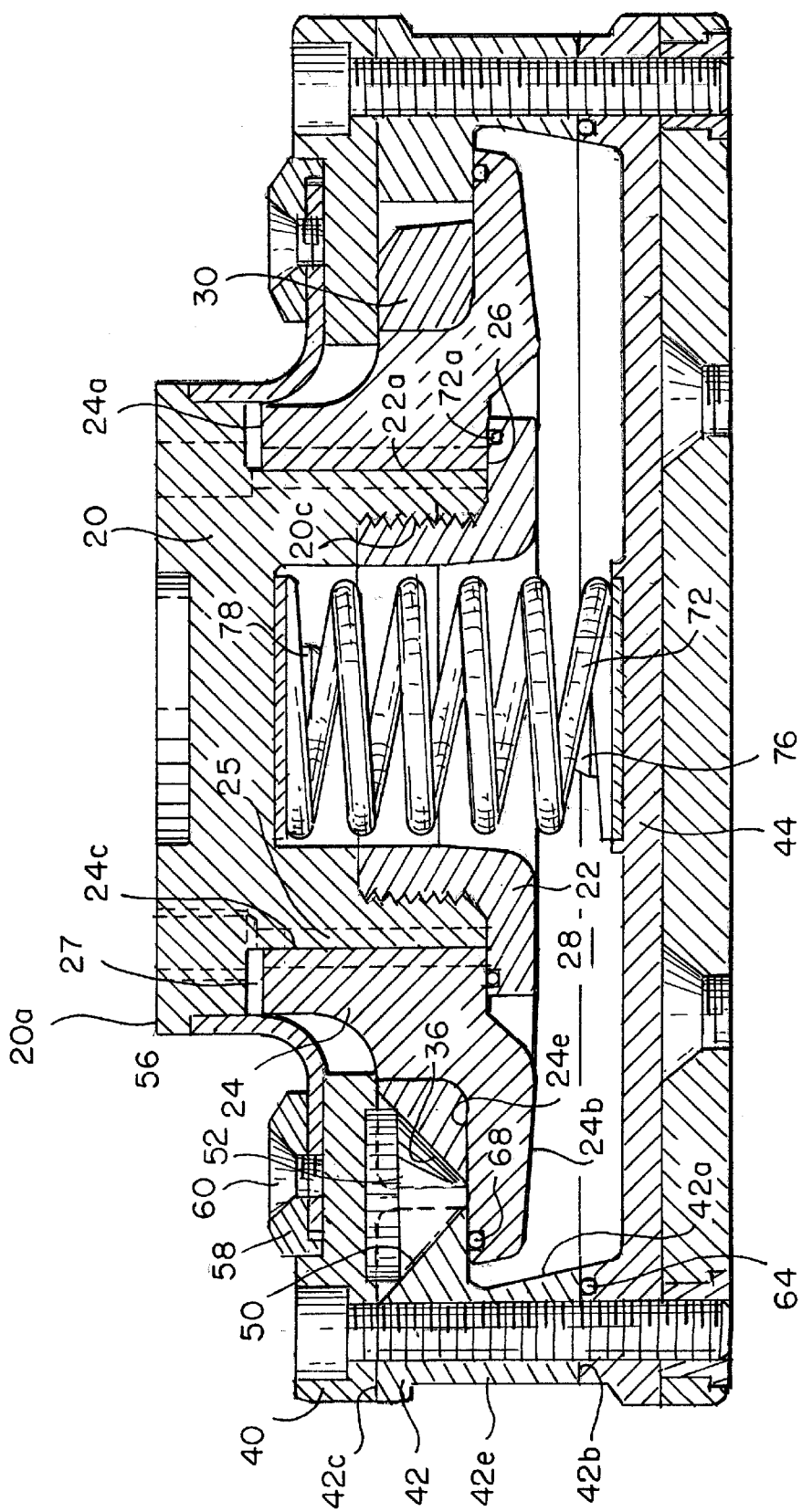
FIG. 3 is a section of the overload protector.

In FIGS. 2 and 3 the tool is mounted to a so-called "rocker assembly" made up of a hub assembly including a hub 20, a hub cap 22, a flange assembly including a main ring 24 and a locating ring 30. The hub has a flange 20a to which the tool is bolted and a hollow cylindrical wall 20b. The inner surface of the hub is threaded and those threads mate with threads 22a formed on the outer wall of the hub cap 22.

The cylindrical wall of the hub is received within a cylindrical wall formed in the main ring 24. Longitudinally extending grooves 20d are formed in the cylindrical wall of the hub and at 24a in the bore of the main ring. These grooves are arranged in pairs so that when one groove in the hub faces one groove in the main ring, each remaining groove in the hub faces a groove in the main ring. A dowel 25 is accommodated in every second pair of facing grooves while the remaining pairs of grooves which face each other are empty. Those dowels prevent the hub from rotating relative to the main ring.

With reference to FIG. 3, the main ring 24 has a lower wall, the inner portion of which rests on the hub cap 22 at 26 and the outer portion of which defines the upper wall of a cavity, generally 28.

The upper wall of the main ring is separated from the flange of hub 20 by a gap 27 and the inside wall of the main ring abuts the cylindrical wall of the hub and is slidable relative thereto.

The terms "lower" and "upper" in the description of the components of the overload protector are intended to facilitate an understanding of the drawings. The terms are not intended to suggest that the orientation of the overload protector must be as shown in the drawings. In fact, the protector may be oriented in any way; it may for example be on its side, upside down or as illustrated in the drawings.

A locating ring 30 is attached by means of bolts 32 to the flange of the main ring. The locating ring together with the flange of the main ring to which it is bolted together make up a so-called "flange assembly". The locating ring has a number of semi-conical recesses 36 spaced along its periphery.

The rocker assembly is mounted within a housing which includes an upper ring 40, a central body 42 and a lower plate 44. These components are interconnected by means of bolts 48b.

The lower wall of cavity 28 is defined by the lower plate 44. The plate is connected either directly or indirectly to the free end of the arm 14 of the robot.

As illustrated in FIGS. 2 and 3, the side wall of the cavity is defined by a circular interior wall 42a of the central body 42. That body has a lower cylindrical wall 42e and an upper flange 42c. Above the central body is the upper ring 40. A port 43 is formed in wall 42e so that air or other fluid may be introduced under pressure into cavity 28.

The central body 42 has a number of semi-conical recesses 50 formed in its interior wall 42d and each of those recesses is adjacent to or faces one of the recesses 36 formed in locating ring 30. Thus each pair of openings 36, 50 defines a complete conical recess. An insert 52 is received in each recess 50 and is held stationary therein by means of upper ring 40. When the tool is not overloaded the inserts 52 have conical outer walls and, being stationary, act as detents which, when the inserts are in the recesses formed in the locating ring, prevent the central body 42 from rotating relative to the locating ring. However, as explained below, when the tool is overloaded the rocker assembly will ride up and the detents in the main ring will exit from the recesses 50 in the locating ring.

Preferably the inserts 52, central body 42 and locating ring 30 are formed of hardened steel to ensure that the sudden violent forces to which these components may be subject when a tool is overloaded do not cause excessive wear.

An annular shield 56 formed of flexible material such as rubber is received in a central circular depression 40a formed in upper ring 40. The shield is sandwiched between the upper ring and a retaining ring 58 and the two rings are inter-connected by means of screws 60. The shield 56 prevents dirt, water and other foreign material from entering cavity 28 and interfering with the operation of the flange.

A number of O-rings serve to seal the cavity when the overload protector is not overloaded or is not forced into an abnormal position. Ring 62 acts as a seal between lower plate 44 and central body 42. That ring is received in an annular groove 64 formed in the wall of the lower ring in contact with the central body. A second O-ring 66 is received in an annular groove 68 formed in main ring 24 and that ring contacts the lower surface of the flange of central body 42. A third O-ring 70 is received in an annular recess 72a formed in hub cap 20 and that ring contacts main ring 24. The two plates 74, 78 serve to reduce the wear on the spring.

Resilient means in the form of a coil spring 72 rests on a lower retaining plate 74 having a hemispherical central portion 76 which is received in the central opening of the spring to prevent the spring from moving laterally. The retaining plate is attached to mounting plate 46. The upper portion of the spring is restrained from lateral movement by means of an upper retaining plate 78 which is attached to hub 20.

The rocker assembly of the overload protector is attached to the tool while the arm of the robot is attached to the housing. The upward pressure of the coil spring as well as the pressure of fluid within cavity 28 will urge the rocker assembly upwardly in the housing so that locating ring 30 contacts the lower surface of upper ring 40.

Inserts 52 serve to locate the rocker assembly in the housing so that the O-rings are effective to seal the cavity. Fluid under pressure in the cavity acts on the underside of the rocker assembly and is the principal means for holding the assembly in a sealing relationship within the housing.

Should the tool be overloaded or forced into an abnormal position the rocker assembly will move relative to the housing. Such movement may be in various directions.

1. Torsion

Figure 4:
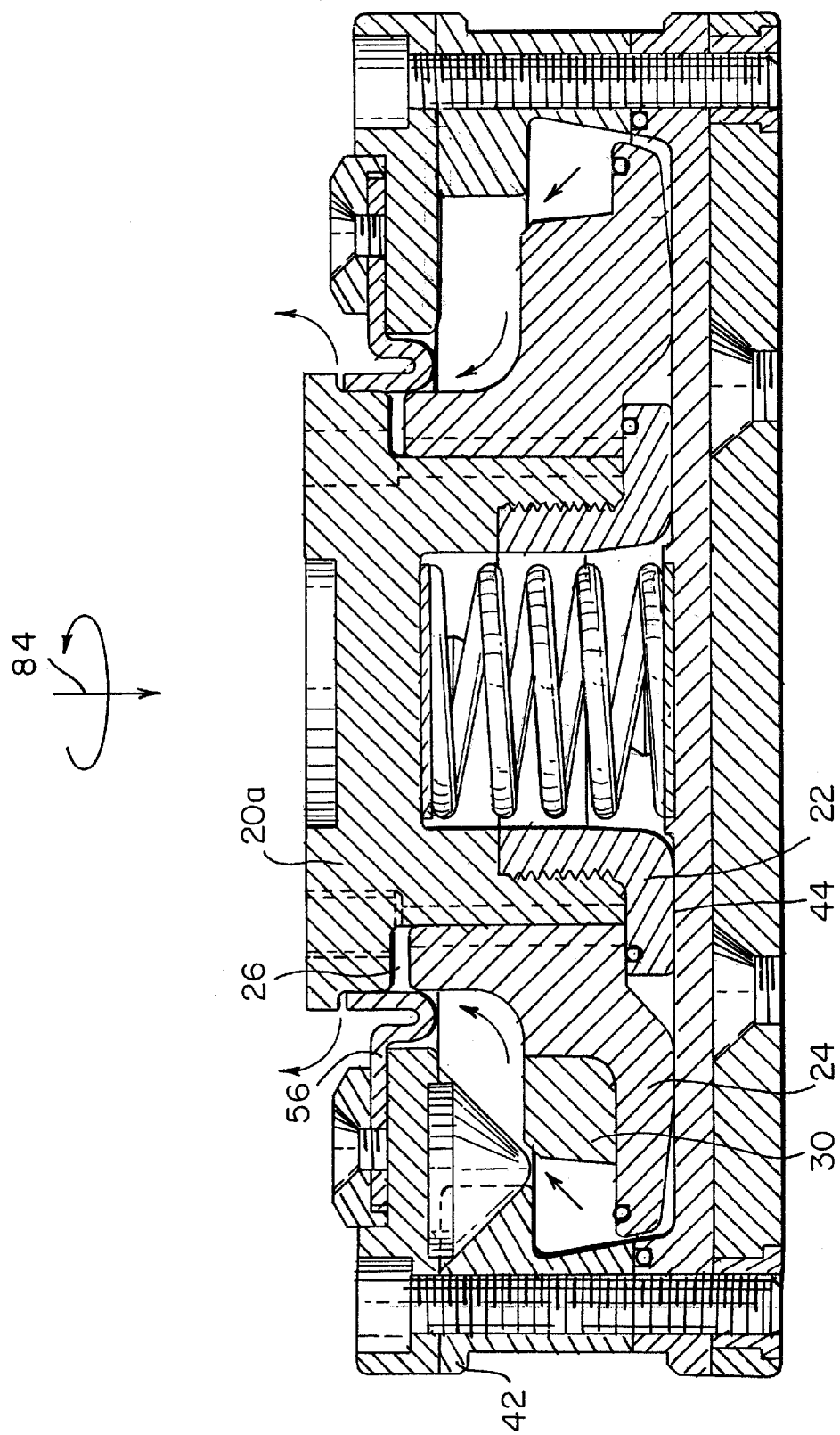
FIGS. 4, 5, and 6 are sections of the overload protector when the tool (not illustrated) to which the protector is attached is subject to abnormal forces.

With reference to FIG. 4, should the force acting on the tool cause it to rotate, the rocker assembly will likewise rotate in the housing. Locating ring 30 will accordingly rotate relative to the central body 42. As the ring rotates, the detents will bear against the walls of the recesses in the locating ring and will force the ring downward. Such movement will break the seal between the main ring and the central body 42 and fluid within the cavity will escape to the atmosphere. The drop in pressure in the cavity will be detected by a pneumatic control device which sends a signal to the computer. That device controls the robot and causes it to cease operating.

There is a description of the means by which a pressure switch operates to send the signal to the computer in the aforementioned Canadian patent no. 2,004,661 and that description is incorporated into this application.

Figure 5:
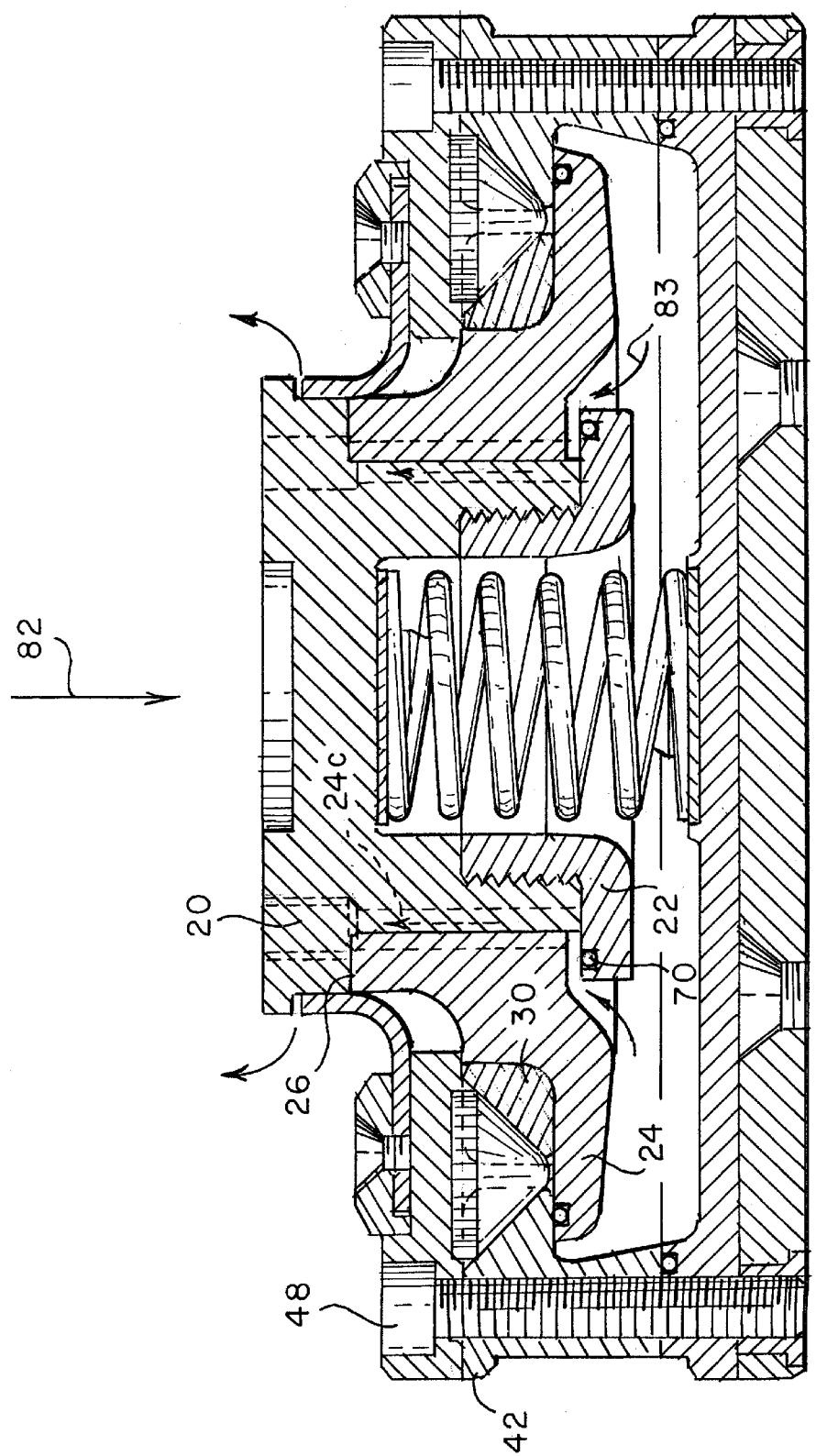

2. Compression (i) Slight Compression: With reference to FIG. 5 should the tool contact a foreign object which causes the tool to move slightly downward in the direction of arrow 82, hub 20 and hub cap 22 will move downward but the main ring 24 will not. That is because the pressure of the fluid within the cavity acts on its lower surface of the main ring and holds it up.

As the hub and hub cap move downward, the sealing effect of O-ring 70 will be broken and a gap opens at 83 between the hub cap and the main ring. Fluid in the cavity escapes through whichever pairs of grooves 20d, 24a in the hub and the main ring, respectively, that do not contain a dowel. The main ring will remain stationary only momentarily until the pressure of fluid in the cavity has diminished to the point where the downward force acting on the tool exceeds the upward force acting on the flange by fluid in the cavity and by spring 72.

(ii) Greater Compression: With reference to FIG. 4, greater movement of the tool in the direction of arrow 84 will cause the gap 26 to close and the flange of the hub cap will force the main ring downward. When the lower wall of hub cap 22 strikes plate 44 such movement will cease.

As the flange moves downward, a gap will open between main ring 24 and central body 42. Fluid within the cavity will escape through that gap and through the space between the flexible shield 56 and flange 20a. The drop in pressure in the cavity will be detected by a pneumatic control device as described above.

3. Force Offset from the Centre Line of the Tool

Figure 6:
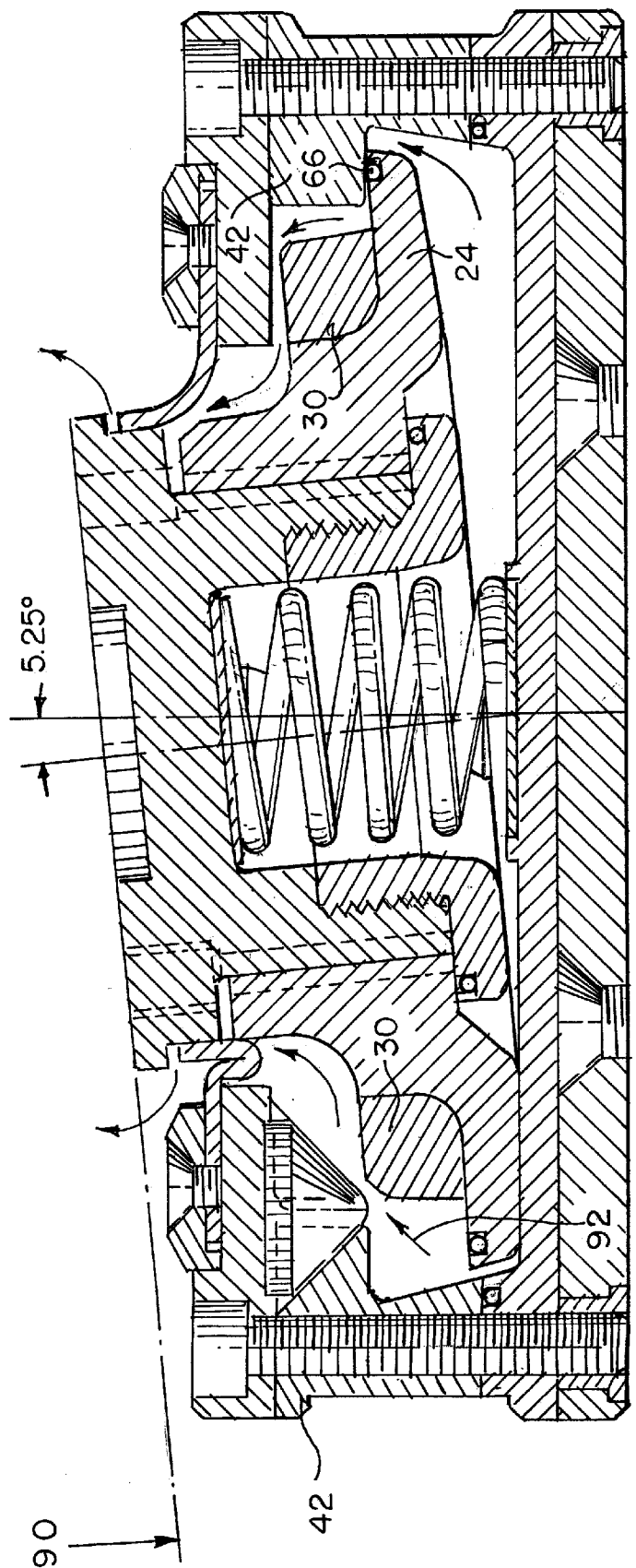

With reference to FIG. 6, a force is directed laterally against the tool thereby causing the rocker assembly to teeter or rock in the direction of arrow 90. As it does so, fluid escapes between locating ring 30 and central body 42 on the left side of the overload protector. On the right side, the outer edge of the main ring 24 rides up against the central body and the sealing effect of O-ring 66 is lost.

It should be noted that because of the close fit of the hub and hub cap in the main ring 24, no movement of these components relative to each other will occur when an offset force is applied to the tool.

It will be understood of course that modifications can be made in the preferred embodiments illustrated and described herein without departing from the scope and purview of the invention as defined in the appended claims.

We claim:

1. In an overload protector adapted to be secured between a robot arm and a tool to protect the tool from being overloaded or forced into an abnormal position, said overload protector having a housing in which a cavity is formed, a rocker assembly disposed within said cavity, means for introducing fluid under pressure into said cavity to force a wall of said rocker assembly into a sealing relationship with a wall of said cavity, overloading of the tool or movement thereof into an abnormal position causing relative movement between said housing and said rocker assembly with resulting leakage of fluid from said cavity and a drop of pressure within said cavity, and means for detecting such pressure drop, the improvement wherein said rocker assembly has a peripheral wall and one of said peripheral wall and said cavity wall has a plurality of semi-conical recesses formed therein and the other of said peripheral wall and said cavity wall has a plurality of semi-conical detents formed thereon, said recesses and detents being arranged such that said detents are accommodated within said recesses when said rocker assembly is in a sealing relationship with said cavity wall.

2. The overload protector as claimed in claim 1 wherein said recesses are formed in the peripheral wall of said rocker assembly and said detents are formed in said cavity wall.

3. The overload protector as claimed in claim 1 wherein said recesses are formed in a peripheral wall of said rocker assembly and said detents are formed in a cavity wall.

4. The overload protector as claimed in claim 1 wherein said recesses are formed in a peripheral wall of said rocker assembly and said detents are formed in a cavity wall.

5. In an overload protector adapted to be secured between a robot arm and a tool to protect the tool from being overloaded or forced into an abnormal position, said overload protector having a housing in which a cavity is formed, a rocker assembly disposed within said cavity, means for introducing fluid under pressure into said cavity to force a wall of said rocker assembly into a sealing relationship with a wall of said cavity, overloading of the tool or movement thereof into an abnormal position causing relative movement between said housing and said rocker assembly with resulting leakage of fluid from said cavity and a drop of pressure within said cavity, and means for detecting such pressure drop, the improvement wherein said rocker assembly includes a hub assembly and a flange assembly, said hub assembly being attached to said flange assembly but slidable relative thereto, said tool being operatively connected to said hub assembly such that when said tool is overloaded in such a way that it causes said hub assembly to advance toward said flange assembly, fluid leaks from said cavity with resulting drop in the pressure of said fluid within said cavity.

6. The overload protector as claimed in claim 5 wherein both said hub and flange assemblies have cylindrical walls which are arranged coaxially, one within the other, the surfaces of said walls which face each other having a plurality of longitudinally extending grooves each of which in one said wall faces a like groove in the other said wall and in some of which are received dowels for preventing rotation of one said wall relative to the other, the grooves not having dowels serving as passages for fluid which leaks from said cavity.

7. The overload protector as claimed in claim 5 wherein said rocker assembly has a peripheral wall and one of said peripheral wall and said cavity wall has a plurality of semi-conical recesses formed therein and the other of said peripheral wall and said cavity wall has a plurality of semi-conical detents formed thereon, said recesses and detents being arranged such that said detents are accommodated within said recesses when said rocker assembly is in a sealing relationship with said cavity wall.

8. The overload protector as claimed in claim 6 wherein said rocker assembly has a peripheral wall and one of said peripheral wall and said cavity wall has a plurality of semi-conical recesses formed therein and the other of said peripheral wall and said cavity wall has a plurality of semi-conical detents formed thereon, said recesses and detents being arranged such that said detents are accommodated within said recesses when said rocker assembly is in a sealing relationship with said cavity wall.

9. The overload protector as claimed in claim 7 wherein said recesses are formed in a peripheral wall of said rocker assembly and said detents are formed in a cavity wall.

10. The overload protector as claimed in claim 8 wherein said recesses are formed in a peripheral wall of said rocker assembly and said detents are formed in a cavity wall.

* * * * *

UNITED STATES PATENT AND TRADEMARK OFFICE
CERTIFICATE OF CORRECTION

PATENT NO. : 5,964,124
DATED : October 12, 1999
INVENTOR(S) : Nunes et al

It is certified that error appears in the above-indentified patent and that said Letters Patent is hereby corrected as shown below:

The title page of the patent should include the following claim for foreign priority:

--[30] Foreign Application Data
July 12,1996 [CA] Canada.., 2,181,097--

Signed and Sealed this

Second Day of May, 2000

Attest:

Q. TODD DICKINSON

*Attesting Officer*     *Director of Patents and Trademarks*